United States Patent [19]

Cawkell

[11] Patent Number: 4,631,599

[45] Date of Patent: Dec. 23, 1986

[54] SELECTIVE OPTOELECTRONIC COPIER

[75] Inventor: Anthony E. Cawkell, Uxbridge, Great Britain

[73] Assignee: Institute for Scientific Information, Inc., Philadelphia, Pa.

[21] Appl. No.: 657,913

[22] Filed: Oct. 5, 1984

[51] Int. Cl.[4] .............................................. H04N 1/40
[52] U.S. Cl. .................................... 358/285; 358/280; 358/293; 355/7; 355/40
[58] Field of Search ............... 358/280, 285, 293, 294; 355/7, 40

[56] References Cited

U.S. PATENT DOCUMENTS

| | | | |
|---|---|---|---|
| 3,318,996 | 5/1967 | Garfield et al. | 178/6.6 |
| 3,541,248 | 11/1970 | Young | 178/6.6 |
| 3,993,865 | 11/1976 | Browne et al. | 178/7.6 |
| 4,196,450 | 4/1980 | Miller et al. | 358/280 |
| 4,205,780 | 6/1980 | Burns et al. | 235/454 |
| 4,251,153 | 2/1981 | Levine | 355/3 R |
| 4,520,399 | 5/1985 | Iida | 358/280 |
| 4,538,182 | 8/1985 | Saito et al. | 358/280 |
| 4,538,183 | 8/1985 | Kanno et al. | 358/280 |

Primary Examiner—James J. Groody
Assistant Examiner—Edward L. Coles
Attorney, Agent, or Firm—Seidel, Gonda, Goldhammer & Abbott

[57] ABSTRACT

An apparatus for selectively copying only certain portions of an image, such as portions of documents containing printed or graphic matter, and eliminating gaps between selected portions to thereby minimize time and memory capacity for storing, transmitting or reproducing the selected portions. A document to be selectively copied is scanned by an optoelectronic scanner which generates an electronic signal representative of the image. The signal is stored in a random access memory (RAM) for read-out at a later time. A microprocessor controls operation of the scanner and addressing of the data in the RAM. The data stored in the RAM may be read out sequentially without gaps between the selected portions of the document. The data read out from the RAM may be sent to a high speed printer, a telecopier, or other transducer for printing, transmission to a remote location, or display.

12 Claims, 3 Drawing Figures

SELECTIVE OPTOELECTRONIC COPIER

BACKGROUND OF THE INVENTION

There are in use today many kinds of copying machines utilizing electro-mechanical, photographic or other techniques, which copy the whole of an image and reproduce one or more copies of the image as a continuous operation. There are also machines which can copy a portion of an image, for example by using a shutter or other barrier to interrupt light reflected from the portion of the image not desired to be copied, or by the use of small hand-held or specially mounted scanning heads capable of scanning a small, defined area.

For example, U.S. Pat. No. 3,993,865 discloses a hand-held scanning device which is moved across a line of print and generates a two-dimensional scan of the print. Movement of the scanner across the page generates strobe pulses which allow the scanner output to be stored in a memory, from which the data are read out to a television monitor. The memory in effect acts as a buffer, so that data which are obtained from the scanner at a variable rate are read out from the memory at a fixed rate suitable for the television raster.

U.S. Pat. No. 3,541,248 discloses a hand-held scanner connected to a recording unit for copying and reproducing lines of text. The rate of linear movement of the reproducer is dependent upon the rate of movement of the scanner to permit high quality reproduction no matter how fast or how slow the scanner is moved across the page.

U.S. Pat. No. 3,318,996 discloses a portable hand-held scanner/reproducer for copying and reproducing printed or graphic material as the original material is scanned.

Selected parts of images often need to be copied, frequently by precise selection, in order to reproduce part of an image which is imbedded within the whole, for example, a sentence within a paragraph of text. It is also often required to reproduce a number of sentences, copied from the same or different documents, in one compact format.

Accordingly, a purpose of this invention is to permit selective copying by selective control of scanning operations or of data generated by a scanning device capable of scanning the whole of an image, or any precisely defined area of it, without the need for special optics, adjustments, or special placement of the scanning transducer.

In particular, a purpose of this invention is to selectively copy, and make ready for reproduction, parts of documents containing printed matter, marks on paper, diagrams, words, sentences, paragraphs or other parts, without gaps between such parts in order to minimize wasted space and save time in storing, transmitting or reproducing the parts selectively copied.

Another purpose of this invention is to enable copies of complete pages, parts of a page, or parts of a number of different pages, to be reproduced on a single page. The term "page" is used here to describe a convenient quantity of information reproduced on paper, or temporarily displayed on an opto-electric, electric or electronic device such as a cathode ray tube for viewing, or permanently or temporarily stored in electrical form so that it may later be reproduced in any suitable manner. The images stored in bit form may also be "edited", i.e., the scanned images may be modified so that the modified page contains parts of the original page, without gaps in order to reduce required storage space, transmission time, and paper when the image is ultimately printed.

Alternatively, editing may be performed without reference to a display by using an in-line sensor or scanning wand, as hereinafter described, whose size embraces the maximum number of lines of text normally required to be selected from a page. A smaller number of lines may be selected by electronically limiting the active length of the wand according to the setting of a control.

A further purpose of this invention is to receive data representing an image from one or more remote stations, convert the data into a visible image so that it may be viewed for the purpose of selecting the whole or portions of it for copying, convert the images back into data form, and transmit these data to one or more remote stations for further processing.

It will be appreciated that copying or selective copying functions can be performed on image information already in bit form from any source and transmitted to any location without the necessity for image transducing. Accordingly, the invention should not be considered as requiring the transducing of images into data bit form.

A still further purpose of this invention is to receive data representing images from a number of sources, for example, from a number of transducers used for copying, in order to store the data for local reproduction, or for onward transmission with or without further manipulation at a convenient time and at a rate limited only by the bandwidth of the available communication channel, to one or more remote destinations.

It may be desired to store one or more images from one or more sources either in the received form, or in an "edited" form, for onward transmission en bloc at a convenient later time, for example, when the cost of transmission is at its lowest.

Alternatively, data and synchronizing pulses may be forwarded in magnetic tape form, in which case the invention may output data at a suitable rate for storage using a small, generally available digital tape recorder of the type used with micro-computers. Data collected from several different places, or from different sites, could thereby conveniently be sent to a central facility for loading into a tape-reading printer.

A further purpose of this invention is to enable a transducer of suitable size to be chosen and plugged into an image processor, whereby a transducer only as large as the maximum size of the image to be copied can be used. By limiting the size of the transducer to the maximum size of the image to be used, the copying process can be made much more efficient and cost-effective.

SUMMARY OF THE INVENTION

The present invention is an apparatus for selectively copying one or more portions of an image. The invention comprises optoelectronic sensor means for viewing the image and generating an electronic signal representative of the image. Write means are provided for causing selected portions of the electronic signal to be stored in a memory, and read means are provided for causing the stored portions of the electronic signal to be recalled from the memory without gaps between the selected portions. An output means presents the recalled portions to a means for processing the recalled portions for further use.

To relieve the user of the need to control the sequence of events required for the correct operation of the invention, to eliminate the need to provide complex controls, and to control the reception and transmission of data at the input and output ports, operation of the invention is controlled by a stored program which initiates control functions via a microprocessor.

In the simplest terms, the invention includes an image processing device embodying a microprocessor and a cathode ray tube, or CRT, to display an image and enable the user to observe and manipulate the image.

Input and output transducers may be directly connected to the image processing device, or remote transducers may be connected to it via an appropriate electrical communication channel. Alternatively, the image processor may be used to receive data representing images from any suitable source or sources. The data may then be transmitted to any suitable destination or destinations with or without editing.

The purpose of an input transducer, for example, an optoelectronic device, is to convert the elements of a visible image into an equivalent form in electrical bits. The purpose of the output transducer, for example, a printer for making marks on paper, is to convert information from bits into visible form.

After the entire image is scanned by the input transducer and has been read into memory, the user may recall the contents of the memory, observe the image in the CRT, and specify, by circumscribing the coordinates of the whole area or precisely selected areas, with the aid of an adjustable electronically-displayed window, that the whole, or parts of the image, are to be copied.

A second scan of the image, during which only the designated area or areas are scanned, is then initiated under the control of the microprocessor from data previously received from the electronic window controls, and the edited output from the sensor unit over-writes the stored information from the first scan. The complete image may be re-scanned as required for further selective copying so that each selected portion may be printed by any suitable reprographic device immediately adjacent the preceeding selected portion to produce a page of the selected portions without gaps between portions.

The invention also provides for economic benefits by utilizing plug-in or switchable blocks of memory within the image processing device so that only as much memory as is needed for the chosen transducer is required.

Various forms of input transducers, such as a video camera or CCD array, may be used.

Economic considerations also require that image-processing be performed at a resolution which is only as high as necessary for the particular application. Accordingly, the invention includes provision for the acceptance of data representing images converted at different resolutions. This is achieved by utilizing either the maximum resolution available from a state of the art transducer, by inhibiting the acceptance of data elements from a high resolution transducer or data source periodically by counting and blanking electronics, or by accepting data from a lower resolution transducer. The invention provides a further economic benefit in that the plug-in or switchable memory can be chosen to be compatible with the transducer used, so that memory storage requirements are reduced.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF A PREFERRED EMBODIMENT

Figure 1A:
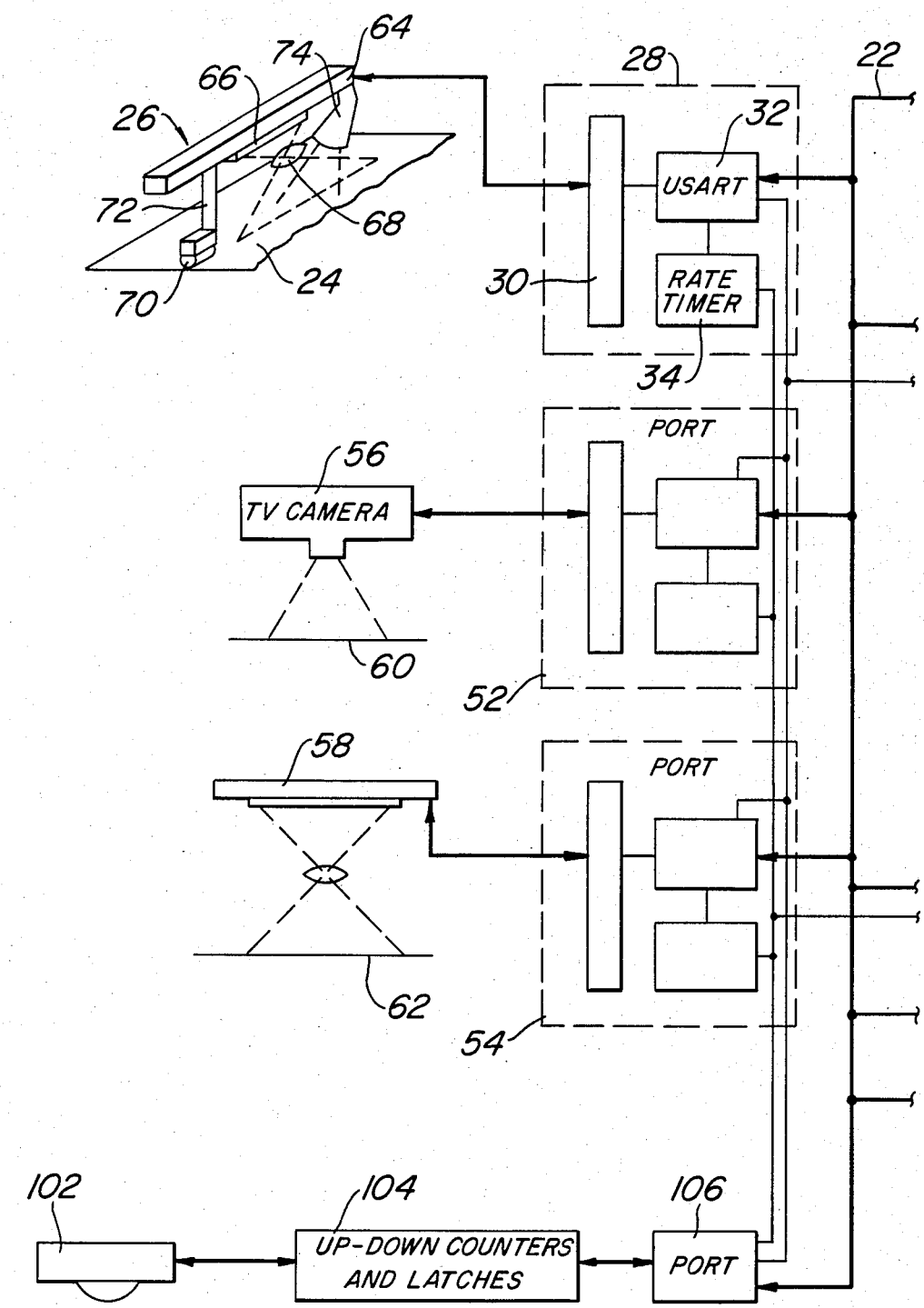
FIGS. 1A and 1B comprise a single block diagram illustrating the operation and interconnection of the major elements of the invention.

Referring now to the drawings, wherein like numerals indicate like elements, there is shown in FIG. 1 a block diagram of a preferred embodiment of a selective optoelectronic copier 10 in accordance with the present invention.

For purposes of describing the invention, it is assumed unless otherwise stated that transducers generate digital output signals either intrinsically, or because any necessary amplification and conversion circuits producing a digital output (e.g. an analog-triggered multivibrator or more sophisticated analog to digital converter) have been included in the transducer housing. If analog transducers without internal digitizing devices are used they should be followed by a commercially available digitizing device - for example, an analog television camera followed by a commercially available converter such as a Colorado Video Inc. model 274c would be satisfactory.

1. General arrangement of the Selective Optoelectronic Copier (SOC)

Figure 1B:
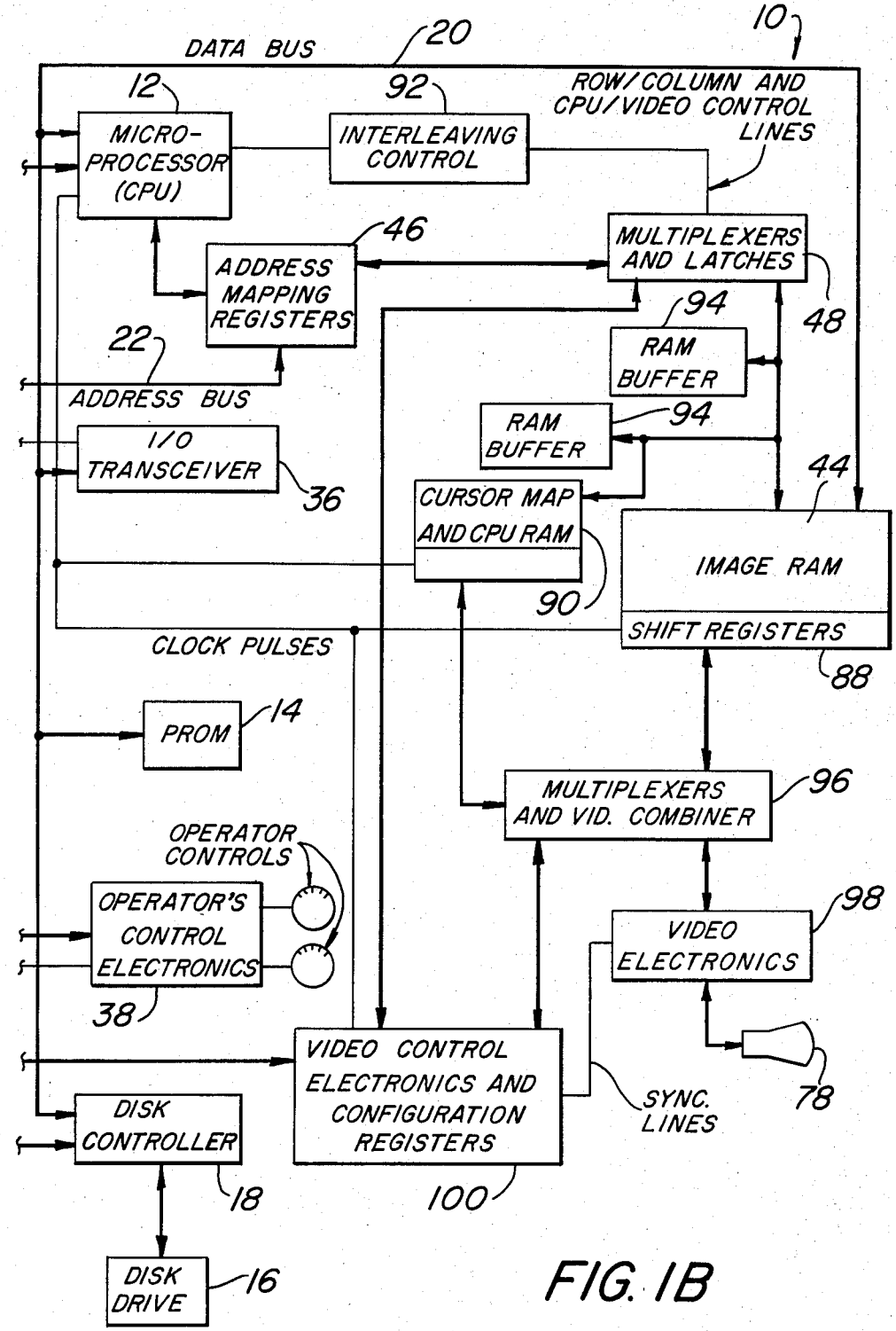

Referring to FIGS. 1A and 1B, it will be seen that operation of the SOC 10 is controlled by the action of central processing unit (CPU) 12, a microprocessor which may be a 16 or 32 bit fast current generation unit such as the Texas Instruments TMS 99000. The SOC 10 is made ready for operation when the operator activates a startup program permanently stored in the programmable read only memory (PROM) 14 which enables the CPU to call up the operating system and application programs stored on a magnetic disk on the disk drive 16 managed by controller 18.

An operating system such as CP/M or MSDOS (trademarks) associated with the chosen microprocessor may be purchased commercially from Digital Research and Microsoft, respectively. The parts of the software required to perform special functions associated with the invention over and above those needed for conventional routines generally used for microcomputer control purposes, will be discussed hereinafter as necessary.

The CPU 12 is connected to controlled units by the data bus 20 and address bus 22. Other control lines not essential for a description of the invention are not shown since they follow conventional microcomputer practice. The CPU 12 manages such activities as timing, internal data transmission, disposition of data of appropriate storage addresses in memory and so forth. The different kinds of activities associated with the operation of the invention are initiated by the user and controlled by the software with event sequences and housekeeping managed by the program-controlled CPU 12.

2. The transducer system and associated circuits

Referring to FIG. 1A, a page 24 to be copied is scanned by an input transducer 26. The transducer is connected to the SOC via an input/output port 28 comprising an interface 30, universal synchronous/asynchronous receiver/transmitter (USART) 32 and baud rate timer 34. The port 28 is connected to the address bus 22 and to the data bus 20 via the input/ output transceiver 36. The port system and control arrangements follow conventional microcomputer practice.

The input transducer 26 represents any of a variety of transducers which may be used with the invention. The essential part of such transducers is an array or arrangement of optoelectronic sensors of CCD, photodiode, or other type which generate a voltage, current, or charge when illuminated.

Figure 2:
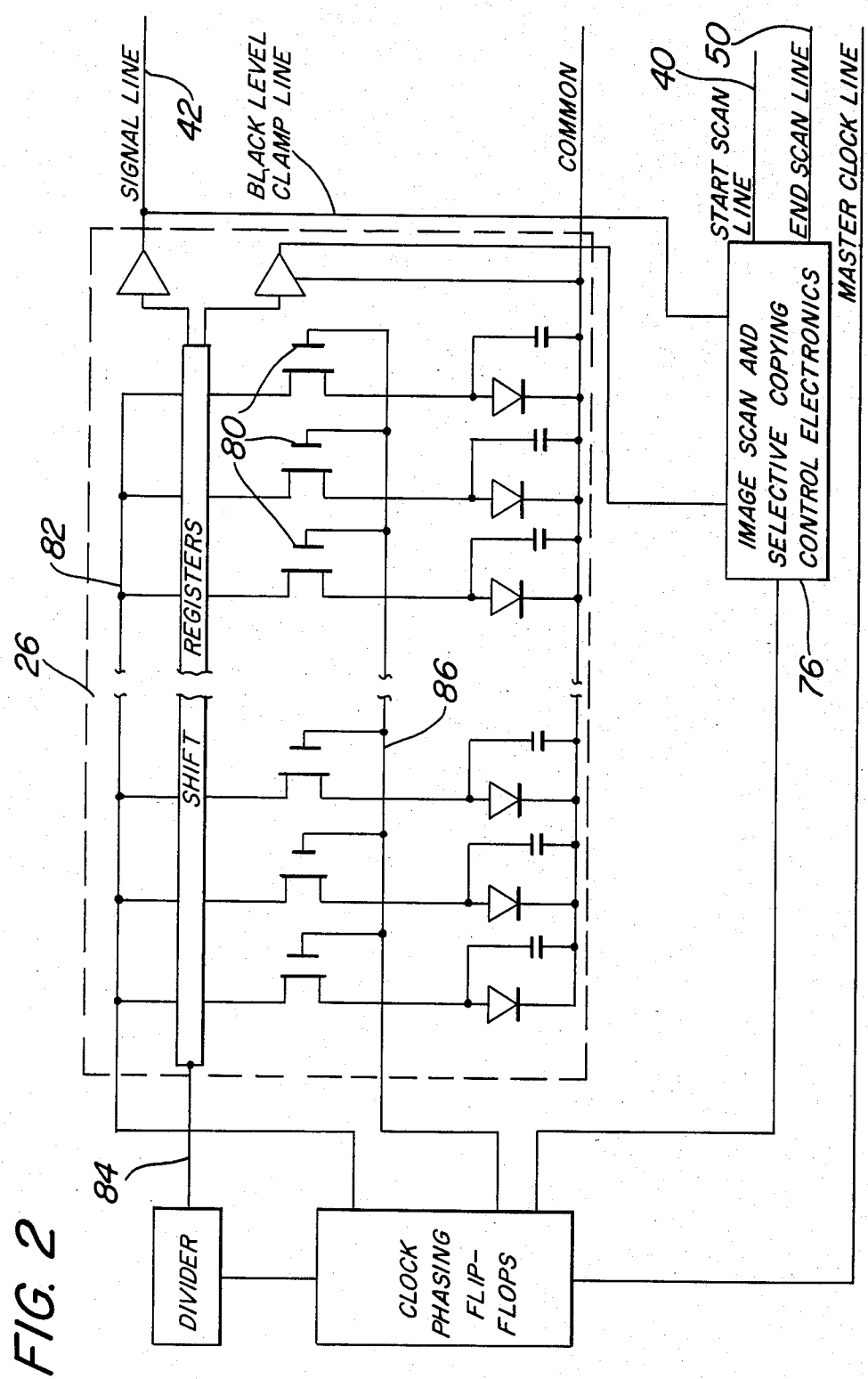
FIG. 2 is a diagram of the major circuit elements associated with a type of transducer and its associated electronics which are particularly suitable for the present invention.

In FIG. 2 only those lines connecting to port 28 which require special mention are shown. When the operator presses a "scan image" key on control unit 38, the SOC CPU 12 enables a transducer scanning and memory write (TSMW) routine via line 40 to start when a further impulse is received from transducer 26 or causes it to start when other types of transducers are in use and control signals are received from another port. Data corresponding to elements of the image are then input via the signal line 42 and data bus 20 to addresses in the image random access memory (RAM) 44 as determined by address mapping registers 46 and as controlled by the CPU 12 via the multiplexer 48 and address bus 22. Details of this operation are described hereinafter. The TSMW routine is concluded by an impulse to the transducer circuitry via the end scan line 50 as determined by program-controlled counters when the number of scanning lines needed to completely scan the document have been counted.

Data about the number of lines to be counted is derived from information fed into the program either by the operator when he selects the height of the image to be copied by adjusting a dial, on the control unit 38 (marked in inches), or by data derived from the trackball and the cursor mapping program (described more fully hereinafter) circuits when selective copying is in progress.

Input/output ports 52, 54, similar to port 28 may be used with other types of transducers for receiving data from remote devices via cables plugged into them, or for outputting image data to local or remote reproducing or storage devices. Appropriate programs needed to control them are stored on disk.

Other types of suitable typical transducers are a TV-type camera 56 with digitized output or a CCD array 58, also with a digitized output. The camera forms an image of the page 60 to be scanned. One video frame of the image is composed of a number of horizontal video lines. The data elements from each line are fed successively into the port 52. The CCD array 58 preferably consists of a number of parallel rows of individual CCD elements each of which responds to a corresponding location on the page 62 to be scanned to the plane of the CCD surface. Each element generates a charge in response to reflected light from the image being scanned. Scanning and reading-out operations are similar to those described below.

To clarify the operation of a transducer, the operations and circuits associated with transducer 26 will be described in more detail. The parts shown within the dotted line in FIG. 2 are available commercially from Texas Instruments as their TC100 series of "CCD linear image sensors" containing from 250 up to 2048 sensor elements providing a resolution of 200 points per inch, and from other vendors.

The transducer assembly 26 (FIG. 1A) consists of a wand 64 supporting a CCD strip sensor 66 used with the recommended 10:1 reducing lens 68 between the wand 64 and the page 24. The wand 64 is arranged for linear reciprocal movement along a line perpendicular to its longitudinal axis. The wand assembly is in contact with the page 24 to be scanned via the synchronizing roller 70 connected to it by strut 72. The page 24 to be scanned is placed below the transducer assembly 26 such that the top edge of the page is parallel to the longitudinal axis of the wand 64. The page is illuminated by the lamp 74.

The transducer assembly may be constructed in a compact form enabling it to be held in the hand and swept, not necessarily at a constant speed, across the page. The sync roller 70 contains an encoder (not shown) which generates pulses as roller 70 rotates about its axis. Any suitable device for generating impulses based on rotational movement may be utilized and need not be described in detail here. The impulses are routed to scanning control and selective copying control circuits 76 (FIG. 2) in order to initiate successive line scans once the TSMW routine has been enabled, as previously described. The wand 64 may be swept across the page up to a speed determined by the exposure time per line required by the sensor strip plus the time needed to shift out data for that line. A counter/timer in circuit 76 prevents the next roller pulse from re-triggering a line scan if manual scanning is carried out too quickly. It will be evident to the operator that he is scanning too quickly from the appearance of the image on the cathode ray tube (CRT) 78.

Alternatively the transducer assembly 26 may be arranged for automatic operation. It will then be constructed as a unit embodying a stepping motor (not shown) which moves the page 24 automatically in precise increments relative to the wand 64 or the wand relative to the page, the wand being held at a constant distance from the page, at a speed which allows for an adequate sensor exposure time and read-out. When the operator presses an appropriate key the stepping motor starts page/wand movement, each step being controlled by end of line scan pulses generated automatically by transducer 26 immediately after data has been shifted out of the last element in the sensor strip 26. The frame (page) scan is terminated by the action of end of line scan pulse counters contained in circuit 76.

The main parts of a typical transducer 26, with a few of its CCD elements 80, are shown within the dotted line in FIG. 2. Circuitry is provided for controlling the transport clock, white reference and end of scan clock, and transfer clock lines 82, 84 and 86, respectively.

As the sensor elements 80 observe successive strips of the image on the page 24, charges accumulate upon them, and a sucession of bits corresponding to those charges is shifted out under software and circuit control before the transducer 26 is moved to the next strip. The shifting-out rate is extremely fast compared to the line-to-line movement of the strip.

Economic considerations require that image-processing be performed at a resolution which is only as high as is necessary for the particular application. Accordingly, the invention includes provision for the acceptance of data representing images converted at different resolutions, or representing smaller images. This is achieved by utilizing either the maximum number of data bits available from a state of the art transducer, or by inhibiting the acceptance of some of the available data elements by counting and blanking electronics contained in scan control unit 76, as set from operator's control unit 38, or by accepting data from a lower resolution transducer, or, assuming that image widths less than 8.5" inches (A4 size) are acceptable, by using a transducer containing a shorter strip of sensor elements.

3. The memory and display circuits

A major purpose of the invention is to perform operations on an electrically stored high quality representation of an image derived from a transducer. 3.74 Megabits of memory are needed to store an A4 size 8.5×11 inch image at 200 elements/inch resolution.

An image random access memory (RAM) 44 of this capacity may be assembled from commercially available memory units but the invention provides for taking an economic benefit as was taken with transducers by providing sockets for accepting only as many RAM units as may be needed for storing electrical representations of images up to a chosen size or resolution.

For example, TMS4161 65536×1 bit RAM units are available from Texas Instruments and as many as may be needed are used in conjunction with the newly introduced Texas Instruments VSC units each comprising a 256 bit shift register 88 and refresh and control electronics with multi-port connections to the image RAM 44.

Cursor/CPU RAM 90 handles routine storage requirements and cursor display mapping.

To improve speeds and efficiency, interleaving of CPU and video activity controlled by interleaving control unit 92 is carried out during each machine cycle following current microcomputer practice. The transportation and destination of address, control, and other data depends on the action of several multiplexers with latching circuits, diagramatically represented at 48. In particular the size of image RAM 44, which may require up to 11 column and 12 row address lines, requires address mapping carried out by address mapping registers 46, and bus multiplexing carried out by multiplexers 48.

Data representing an image from a transducer port is written into the image RAM 44 once via the RAM buffers 94 during the TSMW routine at addresses controlled by microprocessor 12, address mapping registers 46 and multiplexer 48.

To view the stored image frame the data is read out repetitively at 50 or 60 Hz. The program-controlled CPU 12 addresses each byte representing a string of image elements stored in the image RAM 44 via the address mapping registers 46 and multiplexer 48. Data is read out via shift registers 88 and multiplexer and combiner 96 to be correctly positioned on the CRT 78 to form a coherent picture via video circuits 98. Software loaded into the SOC when it is first switched on includes certain values loaded into configuration registers contained in the video controller 100 describing the CRT scanning parameters, cursor start and end, etc. This information is combined with data read out from the RAMs 44 and 90 via the multiplexer and combiner 96.

The CRT line and frame scanning generators contained in video electronics 98 are synchronized by pulses from video controller 100. Data elements describing the image combined with configuration and cursor position data (to be described hereinafter) are used to modulate the intensity of the CRT beam to form patterns of bright dots. Because the time taken for the CRT spot to move one pixel (picture element) width is the same as the time interval between each intensifying pulse, both being controlled by signals derived from the same clock in the CPU, a line of on or off equi-spaced pixels is traced out followed by further lines generated in video electronics and synchronized from video control 100 until the image frame is complete.

Although the CRT 78 is not used for the ultimate reproduction of the image, the 200 elements per inch resolution specified for the SOC demands a cathode ray tube of very good resolution in order that fine detail on the image may be visible for inspection and selective copying. The Tektronix GMA304 19" CRT is such a tube.

The elements describing the image and the data from RAMs 44 and 90 are retained until the initiation of another image scan by the continuous operation of a refresh sweep caried out every 4 milliseconds which renews the decaying charge on each storage element. The refresh sweep is initiated by the CPU at an appropriate time in the machine cycle. In essence, it consists of strobing RAM row addresses in a manner very similar to the procedure used during a read cycle by circuits associated with shift registers 88.

4. Mapping cursor movement

The invention incorporates separate arrangements for superimposing information for selective copying on to the displayed image without the need to use further large capacity RAM circuits.

The stored image display, read in once and scanned out continuously for viewing purposes, is associated with area information ("corner plotting" (CP)) generated by the operator using the cursor, as described hereinafter, stored in cursor/CPU RAM 90. CP data read into cursor/CPU RAM 90 may need to be changed quite rapidly by cursor movement and the movements must be visible to the operator, so provision is made for it to be read in once during each machine cycle. It is continuously read out in synchronism with the image data into mulitiplexer and combiner 96. The resolution of this information need be no better than is needed for marking the corners of that part of the image to be selected for copying—a 500×500 pixel display with 64K RAM storage is adequate, as specified for cursor/CPU RAM 90.

CP information is required to be superimposed upon image information so the scanning-out lines of the CP display are triggered by the same impulse used for triggering image scanning lines via a time divider circuit. For example if the image display has 2000 lines and the CP display 500, a divide by 4 circuit would be used. The width of the cursor-drawn line then represents 4×4 pixel blocks on the image scan—about 0.2 inches wide on the surface of the fine-spot CRT selected for the invention.

5. Cursor operation

After the image has been read into image RAM 44, screen cursor control and movement is carried out by the operator with the aid of the trackball counter 102, data latch and up-down counters 104, and port 106 (containing the same circuit elements as other ports). Trackballs are commercially available—for instance the LT200 from Disc Instruments—and consist of a ball about 2 inches in diameter (about 6.28 inches in circumference) which is retained by and rolls in a socket when the exposed part of the ball is in contact with a flat surface and the socket is pushed by hand. Rotation of the ball is resolved into X and Y axis motion by two optical interruptor disks coupled to it at right angles to each other, each of which generates a train of about 500 electrical impulses per revolution of the ball.

The outputs from the two disks are coupled to circuits incorporating the up-down counters, sensing logic to respond to forward or reverse motion, and counter upper and lower limit detection logic so that the direction of movement of the cursor on the CRT screen, arranged as described below to correspond with the directional rotation of the ball, is restricted within the screen's boundaries.

The X/Y co-ordinates of the trackball's pulse output are mapped into cursor/CPU RAM 90 by conventional software. Each movement of the cursor is accompanied by the creation of 4×4 data bits in a succession of different addresses in cursor/CPU RAM 90. To display the cursor positions, the contents of cursor/CPU RAM 90 are read out synchronously with the image data from image RAM 44, combined with it in multiplexer and combiner 96, and routed to video circuits 98. When those elements containing "white" data representing the cursor are addressed, the cursor pattern overwrites image data on the screen.

The cursor moves by one pixel per ball impulse. If the ball 102 is pushed, for example, 6.28 inches (one revolution) across a flat surface, generating approximately 500 impulses in such a way that the cursor moves diagonally across the screen, and the scanning and modulation arrangements provide for a screen resolution, when the contents of the image RAM 44 are viewed, of 50 pixels/inch, then the cursor will have moved about 5 inches. In short, the cursor may be accurately positioned on the screen by moving the trackball 102. Another device called a "Mouse" can be used to fulfill the same purpose.

6. Selective Copying

Provision is made in the invention for two methods of selective copying.

In the first method using a manually operated wand, the portion of the image copied will be no wider than the width of the selected wand (commercially available strips of sensor elements are available in various widths commencing at one inch) and no taller than the distance that the operator moves the wand. For example, if the operator used a wand 8.5 inches wide, placed it over the middle of an A4 sheet, and moved it 2 inches in a vertical direction, the portion copied would be 8.5 inches wide (the width of the whole of an A4 image) by 2 inches of the portion just above the center.

Alternatively, if a wand 4 inches wide was used, and it was placed across the bottom left hand edge of the image and swept upwards to traverse the whole of it, the portion copied would be a column 4 inches wide at the left hand edge of the image.

The same comments apply to selective copying using a stepping motor-driven wand/paper system, as described earlier, provided that the sytem enables a wand of chosen width to be used which can be placed over any aprt of the image and stopped at will.

When small areas of a page are to be routinely copied—for instance abstracts or article headers—the invention provides for using no more storage elements than are needed in image RAM 44, as already described.

The second method available for selective copying uses an electronic portion selecting process, as described below, which may often be quicker and more convenient, since it does not involve wand size selection or positioning.

In this case, a page carrying an image is first scanned completely and displayed together with cursor data by methods already described. The operator then moves the cursor successively to the top left (1), top right (2) and bottom right (3) corners of the part of the image that he wishes to copy, pressing a key labelled "select area to copy" on control unit 38 immediately after each positioning of the cursor. Each depression of the key causes the address of the cursor data in cursor/CPU RAM 90 when the cursor is in that position to be stored in registers in the scan and selective copying control circuits 76. (The three cursor positions are numbered above for reference purposes.)

When the operator presses a key labelled "display selected area", a routine somewhat similar to the TSMW routine described earlier is executed with the aid of circuits within control unit 76. The TSMW routine proceeds as previously described except that the output signal line from optoelectronic sensor unit 26 is normally clamped at black level by control unit 76. Circuits within control unit 76 unclamp the signals as follows.

During cursor positioning operations the contents of RAMs 44 and 90 are scanned out synchronously as previously described. During selective copying operations the contents of each storage element of cursor/CPU RAM 90 is scanned out in the order in which is was stored while data is being selectively read in to image RAM 44 from the transducer. The address of each element in cursor/CPU RAM 90 is successively fed to a comparator circuit in scan control unit 76 arranged to trigger when the arriving address coincides with the address of position (1) stored in a register. When the addresses coincide, the comparator latches, the black signal clamp is removed, and the whole or part of that line of black or white signal elements from the sensor reach port 28. The comparator stays in that state until reset by the next column address from cursor/CPU RAM 90 enabled in consequence of the next operation.

A second comparator circuit contains the address of position (2) to which the column address of each element from cursor/CPU RAM 90 is also successively fed. When the addresses coincide, the black line clamp is applied for the remainder of that line so that portion of the image is black. This comparator is reset to operate thereafter only upon receipt of column addresses.

The net effect of these two comparators is to permit a selected portion of the image whose top left hand edge was defined by positioning the cursor at (1) to be displayed within left and right vertical boundaries set by cursor positions (1) and (2).

The image continues to be displayed in this manner until the address of each element being read out from cursor/CPU RAM 90 coincides with the address stored in a third comparator derived from position (3) of the cursor—that is, the bottom right hand corner of the selected area of the image. The signal line is then clamped black and remains so until scanning of the image is completed.

7. Output Control

Copying of the whole or part of the image is accomplished by dispatching a stream of bits from image RAM 44, representing the image, to a local or remote device via an input/output port under software/CPU control. The parameters of the selected port, for example port 54 (which in FIG. 1 is being used for an input device), are set under software/CPU control, following conventional computer practice. In particular, the rate timer is set for the transmission rate to be suitable for a local reprographic device or for the bandwidth of a communication channel being used to convey the information to a remote reprographic device or to remote storage. Typically the port will embody a standard interface, such as RS232, for the convenient connection of a printer, data recorder, or telecommunication channel.

Another purpose of the invention, achieved by adopting the methods already described, is to avoid wasting paper or storage space. Selected parts of images, transmitted one at a time, may be readily reproduced closely spaced. For example, a number of article headings, including the title, author and address, by lines etc., could be selectively copied from a journal and reproduced one beneath the other on a single sheet of paper by a printer controlled by the SOC to step ahead one line before accepting the next image.

It will be appreciated that the foregoing invention achieves the objectives set forth above in a unique and nonobvious manner.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for selectively storing and copying one or more portions of an image, comprising:
   (a) optoelectronic sensor means for making first and second optical scans of the entire image and generating an electronic signal representative of the image,
   (b) means for storing the electronic signal from the first optical scan in a memory,
   (c) means for selectably reducing the effective resolution of the sensor means to selectably reduce the the amount of memory space required for storage of the electronic signal,
   (d) means operatively associated with the electronic scanning means for selecting the portions of the entire image to be copied,
   (e) write means responsive to the selecting means and the second optical scan for causing portions of the electronic signal corresponding to the portions of the image to be copied to over-write the signal from the first optical scan in said memory,
   (f) read means for causing the portions of the electronic signal corresponding to the portions of the image to be copied to be recalled from the memory without gaps between the selected portions, and
   (g) output means for presenting the recalled portions of the electronic signal to means for transmitting the recalled portions over a telecommunications channel to a remote location.

2. Apparatus as in claim 1, wherein the sensor means comprises a linear array of photosensors which generate an output dependent upon the optical characteristics of the image being scanned and which are arranged to scan the image in successive parallel rows.

3. Apparatus as in claim 1, wherein the sensor means comprises a matrix array of photosensors which generate an output dependent upon the optical characteristics of the image being scanned, the array being arranged to simultaneously scan the image in rows and columns.

4. Apparatus as in claim 1, wherein the sensor means comprises a video camera.

5. Apparatus as in claim 1, wherein the write means and the read means comprise a microprocessor.

6. Apparatus as in claim 1, further comprising display means for displaying the image to an operator.

7. Apparatus for selectively storing and copying one or more images or one or more portions of the same image, comprising:
   (a) one or more independent optoelectronic sensor means for individually making first and second optical scans of different images or different portions of the same image and generating electronic signals representative of the images or portions of the image,
   (b) means for storing the electronic signal from the first optical scan in a memory,
   (c) means for selectably reducing the effective resolution of each sensor means to selectably reduce the amount of memory space required for storage of the electronic signal,
   (d) signal selector means for sequentially selecting from among the electronic signals an individual signal according to predetermined criteria,
   (e) portion selector means operatively associated with the signal selector means for selecting the portions of the image to be copied,
   (f) write means responsive to the portions selector means and the second optical scan for causing the portions of the selected electronic signals corresponding to the portions of the image to be copied to over-write the signal from the first optical scan in said memory,
   (g) read means for causing the portions of the stored selected signals corresponding to the portions of the image to be copied to be recalled from the memory without gaps between the selected signals, and
   (h) output means for presenting the recalled portions of the selected signals to means for transmitting the recalled portion over a telecommunications channel to a remote location.

8. Apparatus as in claim 7, wherein the sensor means include a linear array of individual photosensors, a matrix array of photosensors, a video camera, or any combination thereof.

9. Apparatus as in claim 7, whrein said write means and read means comprise a microprocessor.

10. Method of selectively copying one or more portions of an image, comprising the steps of:
    (a) making a first optical scan of the entire image and generating a first signal representative of the image,
    (b) storing the first signal in a memory,
    (c) designating the portions of the image selected to be copied,
    (d) making a second optical scan of only the portions of the image selected to be copied and generating a second signal representative of those portions,
    (e) replacing the first signal in the memory with the second signal, and
    (f) recalling the second signal for further processing.

11. Method as in claim 10, further comprising the step of reproducing from the recalled second signal the portions selected to be copied.

12. Method according to claim 10, further comprising the step of transmitting the recalled second signal to a remote location.

* * * * *